US012020188B2

(12) United States Patent
Jacob et al.

(10) Patent No.: US 12,020,188 B2
(45) Date of Patent: *Jun. 25, 2024

(54) TASK MANAGEMENT USER INTERFACE (GUI)

(71) Applicant: STATE FARM MUTUAL AUTOMOBILE INSURANCE COMPANY, Bloomington, IL (US)

(72) Inventors: Michael Shawn Jacob, Le Roy, IL (US); Manali Desai, Bloomington, IL (US); Leah Garcia, Hudson, IL (US); Oscar Allan Arulfo, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/075,066

(22) Filed: Dec. 5, 2022

(65) Prior Publication Data

US 2023/0116141 A1    Apr. 13, 2023

Related U.S. Application Data

(63) Continuation of application No. 16/739,489, filed on Jan. 10, 2020, now Pat. No. 11,521,141.

(51) Int. Cl.
*G06Q 10/0631* (2023.01)
*G06F 3/0486* (2013.01)
*G06F 9/451* (2018.01)
*G06Q 10/0633* (2023.01)

(52) U.S. Cl.
CPC .... *G06Q 10/063118* (2013.01); *G06F 3/0486* (2013.01); *G06F 9/453* (2018.02); *G06Q 10/063112* (2013.01); *G06Q 10/0633* (2013.01)

(58) Field of Classification Search
None
See application file for complete search history.

(56) References Cited

U.S. PATENT DOCUMENTS

| 7,769,705 | B1 | 8/2010 | Luechtefeld |
| 7,885,844 | B1* | 2/2011 | Cohen ............... G06Q 10/10 |
| 7,918,388 | B2 | 4/2011 | Abecassis et al. |
| 8,464,161 | B2 | 6/2013 | Giles et al. |
| 8,660,881 | B2 | 2/2014 | Wood et al. |

(Continued)

FOREIGN PATENT DOCUMENTS

| WO | WO-0124037 A2 | 4/2001 |
| WO | WO-18235028 A1 | 12/2018 |

OTHER PUBLICATIONS

What is Task Management? Drop Task. Retrieved from <https://www.droptask.com/task-management/> (2019).

*Primary Examiner* — Stephanie Z Delich
(74) *Attorney, Agent, or Firm* — MARSHALL, GERSTEIN & BORUN LLP

(57) ABSTRACT

A task management platform generates an interactive display tasks based on multi-team activity data of different geographic locations across a plurality of distributed guided user interfaces (GUIs). Additionally the task management platform uses a distributed machine-learning based system to determine a suggested task item for a remote team based on multi-team activity data of different geographic locations.

20 Claims, 10 Drawing Sheets

(56) References Cited

U.S. PATENT DOCUMENTS

| | | |
|---|---|---|
| 9,779,386 B2 | 10/2017 | Swierz, III et al. |
| 10,104,182 B1 | 10/2018 | Lowit et al. |
| 2008/0155547 A1* | 6/2008 | Weber .................. G06Q 10/109 718/102 |
| 2014/0297395 A1 | 10/2014 | Chao et al. |
| 2015/0120353 A1 | 4/2015 | Williger et al. |
| 2015/0127400 A1 | 5/2015 | Chan et al. |
| 2015/0134391 A1 | 5/2015 | Gordon et al. |
| 2017/0076234 A1* | 3/2017 | Pendell ............ G06Q 10/06313 |
| 2017/0116552 A1 | 4/2017 | Deodhar et al. |
| 2019/0102425 A1 | 4/2019 | Obeidat |
| 2019/0286462 A1* | 9/2019 | Bodnick .................. G06F 9/453 |
| 2019/0340562 A1 | 11/2019 | Tayal et al. |
| 2019/0378348 A1 | 12/2019 | Fox et al. |
| 2020/0125586 A1 | 4/2020 | Rezaeian et al. |
| 2020/0210965 A1 | 7/2020 | Garber et al. |

* cited by examiner

Garcia Ins and Fin Svcs Inc
LeahGarcia
Phone: 132-456-7890
Office: Get Directions
Contact: Email Agent
Make a Payment: Pay Insurance Bills Get a
Quote
Auto ▼
ZIP Code
Go

Products and Services

Auto Insurance
Learn More

Home Insurance
Learn More

Property Insurance
Learn More

Start
Claim
Auto ▼
Go

| Location | About me | Our Mission | Our Team | We're Hiring |

Street Address — 314
Phone: 123-456-7890
Fax: 123-123-4567
Office Hours: (EST)
Landmark
310 — Languages
312 — Credentials Map

Agent Homepage — Data updated Jul 10, 2018 at 1:36 PM

| Leads | Quotes | Cancellation | Claims | Policy Changes | Renewals |
|---|---|---|---|---|---|
| 88 | 8 | 9 | 40 | 20 | 8 |

Cases by Case Origin

Service Request Origin

510 — (donut chart with values 32, 22, 9, 7, 10, 4, 19, 16)

As of Today at 11:36 AM

Open Service Tasks — 520

Record Count: 0, 20, 40, 60

Josh  Team  Leah  Manali  Mike  Jeff

Type: ☑Call  ▦Email  ☒Meeting  ☑Prep  ☐Other

View Report                As of Today at 11:36AM

Upcoming Simple Conversation — More

🗐 Upcoming Simple Conversations
0 items, sorted by Simple Conversations Name

There's nothing in Upcoming Simple Conversations yet. When records are added to this list view, you'll see them here.

New Claims — More

🗐 New Claims
2 items, sorted by Claim Name
Filtered by Record Type

C-000040
Policyholder: Broderick Jacobs
FNOL: 10/29/2018
Claim Type: Auto
Claim Sub Type: Property Damage
Claim Description:

C-000041
Policyholder: Broderick Jacobs
FNOL: 10/29/2018
Claim Type: Auto
Claim Sub Type: Property Damage
Claim Description: backed to a pole

Opportunities with No Next Steps

Opportunity Owner (donut chart with values 19, 2, 1, 1, 2, 1)

Today's Service Tasks — More

▦ Today's Service Tasks
0 items, sorted by Due Date
Filtered by Closed Recurring Parent...

There's nothing in Today's Service Tasks yet.

Cancellations

TASK MANAGEMENT USER INTERFACE (GUI)

CROSS-REFERENCE TO RELATED APPLICATIONS

This application is a continuation of and claims priority to U.S. patent application Ser. No. 16/739,489, entitled "TASK MANAGEMENT USER INTERFACE (GUI)" and filed on Jan. 10, 2020, the disclosure of which is hereby incorporated by reference herein in its entirety.

FIELD OF THE DISCLOSURE

The present disclosure generally relates to big data and cloud-based platforms and, more particularly, to a big-data and cloud based platforms for generating guided user interfaces (GUIs) and notifications at the GUIs.

BACKGROUND

Typical office management software and/or platforms provide general office task assignment, planning and management capabilities, but fail to provide cross-platform, and cross business, solutions. Additionally, typical office management software and/or platforms fail to collect adequate metrics. Consequently, such office management software and/or platforms typically constitute waste in the form of end user (e.g., office personnel, agent(s), etc.) manual work and/or use, training, and/or dependency on multiple, disparate management software and/or platforms which leads to numerous inefficiencies. Additionally, office task management efficiencies or inefficiencies are based on end users' cognitive recall and manual best practices. If end users are abruptly unavailable, there are inadequate records of task assignment, planning, and status which creates complexity. For example, end users generally require and rely on various manual processes and paper work to manage their business and office staff. Conventional management software products generally fail provide comprehensive and business-need specific solutions that help end users manage their office and business effectively. For example, such office software management products are generally narrowly focused, and have limited capabilities, and, thus, require an office to utilize multiple software products which can lead to inefficiencies, including redundancies and desynchronized data. In addition, data failures and redundancy in such office management products leads to potential errors and/or poor insights into real-time statuses of a plurality of business issues. For example, end users may be forced to manually synthesize/derive the information from paper files or non-integrated office management software products to perform evaluations or analysis, e.g., such as evaluating a team member's performance or assigning and reassigning tasks.

For the foregoing reasons, there is a need for task management systems and methods configured to generate integration GUIs.

SUMMARY

As disclosed herein, task management platform is configured for generation of GUIs. In an embodiment, a system for generating interactive display tasks based on multi-team activity data of different geographic locations across a plurality of distributed guided user interfaces (GUIs) is described. The system includes a server in communication with a first client device and a second client device; a first dashboard application executing on the first client device, the first dashboard application configured to transmit, to the server, activity data defining a first set of interactive display tasks of a first team at a first geographic location; and a second dashboard application executing on the second client device. The second dashboard application is configured to: transmit, to the server, activity data defining a second set of interactive display tasks of a second team at a second geographic location, implement a second GUI displaying the second set of interactive display tasks on a display of the second client device, and receive, from the server, a suggested interactive display task, the suggested interactive display task based on each of the activity data defining the first set of interactive display tasks and the activity data defining the second set of interactive display tasks.

The first geographic location may be remote from the second geographic location. Optionally, the second set of interactive display tasks may be rendered as a set of drag and drop windows, each of the second set of interactive display tasks defining a task item and generated for a least one team member of the second team, and the second dashboard application may be further configured to, in response to authorization of the suggested interactive display task at the second client device, add the suggested interactive display task to the second set of interactive display tasks including rendering the suggested interactive display task on the second GUI as a new drag and drop window.

The suggested interactive display task may include a suggested task item for assignment to at least one member of the second team. The suggested task item may be a suggested staffing related task, a suggested compensation related task, a suggested employee training related task, or a suggested workflow related task.

The first dashboard application may be further configured to implement a first GUI displaying the first set of interactive display tasks on a display of the first client device, the first set of interactive display tasks rendered as a set of drag and drop windows, each of the first set of interactive display tasks defining a task item and generated for at least one team member of the first team. Optionally, each of the first dashboard application and the second dashboard application may execute a common set of instructions to render each of the first GUI and the second GUI.

The second dashboard application may be further configured to: receive from the server an additional suggested interactive display task based on each of the first set of interactive display tasks and the second set of interactive display tasks, the additional suggested interactive display task including an additional suggested task item for assignment to the a least one member of the second team; and in response to authorization of the additional suggested interactive display task, add the additional suggested interactive display task to second set of interactive display tasks including rendering the additional suggested interactive display on the second GUI as an additional new drag and drop window.

The server may be further configured to: determine a similarity metric based on at least a portion of characteristics of the first team at the first geographic location and at least a portion of characteristics of the second team at the second geographic location; and in response to the similarity metric being above a threshold, generate the suggested interactive display task. Optionally, the characteristics of the first team may include first team geographic location characteristics, first team size characteristics, and first team member characteristics; and the characteristics of the second team may include second team geographic location characteristics, second team size characteristics, and second team member characteristics.

The server may be in further communication with a third client device and may further comprise: a third dashboard application executing on the third client device. The third dashboard application may be configured to: transmit to the server activity data defining a third set of interactive display tasks of a third team of a third geographic location, and implement a third GUI displaying the third set of interactive display tasks on a display of the third client device as a set of drag and drop windows, each of the third set of interactive display tasks defining a task item and generated for a least one team member of the third team. The third geographic location may be remote from the first geographic location and the second geographic location, and the suggested interactive display task generated by the server may be further based on the activity data defining the third set of interactive display tasks.

The server may be in further communication with a third client device and may further comprise: a third dashboard application executing on the third client device. The third dashboard application may be configured to: transmit to the server activity data defining a third set of interactive display tasks of a third team of a third geographic location and implement a third GUI displaying the third set of interactive display tasks on a display of the third client device as a set of drag and drop windows, each of the first set of interactive display tasks defining a task item and generated for a least one team member of the third team. The third dashboard application may further be configured to: receive from the server, an additional suggested interactive display task, the additional suggested interactive display task based on each of the activity data defining the first set of interactive display tasks, the activity data defining the second set of interactive display tasks, and the activity data defining the third interactive display tasks, and including an additional suggested task item for assignment to a least one member of the third team; and in response to authorization of the additional suggested interactive display task, add the additional suggested interactive display task to third set of interactive display tasks including rendering the additional suggested interactive display task on the third GUI as an additional new drag and drop window. The third geographic location may be remote from the first geographic location and the second geographic location.

In another embodiment, method for generating interactive display tasks based on multi-team activity data of different geographic locations across a plurality of distributed guided user interfaces (GUIs) is described. The method comprises: receiving, at a server from a first dashboard application, activity data defining a first set of interactive display tasks of a first team at a first geographic location, wherein the first dashboard application executes on a first client device in communication with the server; receiving, at the server from a second dashboard application, activity data defining a second set of interactive display tasks of a second team at a second geographic location, wherein the second dashboard application executes on a second client device in communication with the server, and wherein the second dashboard application implements a second GUI displaying the second set of interactive display tasks on a display of the second client device; and transmitting, to the second dashboard application from the server, a suggested interactive display task, the suggested interactive display task generated by the server based on each of the activity data defining the first set of interactive display tasks and the activity data defining the second set of interactive display tasks.

The first geographic location may be remote from the second geographic location. The second set of interactive display tasks may be rendered as a set of drag and drop windows, each of the second set of interactive display tasks defining a task item and generated for a least one team member of the second team, and the second dashboard application, in response to authorization of the suggested interactive display task at the second client device, may add the suggested interactive display task to second set of interactive display tasks including rendering the suggested interactive display on the second GUI as a new drag and drop window.

The suggested interactive display task may include a suggested task item for assignment to a least one member of the second team. The first dashboard application may implement a first GUI displaying the first set of interactive display tasks on a display of the first client device as a set of drag and drop windows, each of the first set of interactive display tasks defining a task item and generated for a least one team member of the first team. Each of the first dashboard application and the second dashboard application may execute a common set of instructions to render each of the first GUI and the second GUI.

The method may further comprise: determining, at the server, a similarity metric based on at least a portion of characteristics of the first team at the first geographic location and at least a portions characteristics of the second team at the second geographic location; and in response to the similarity metric being above a threshold, generating the suggested interactive display task.

In yet another embodiment, a tangible, non-transitory computer-readable medium storing instructions for generating interactive display tasks based on multi-team activity data of different geographic locations across a plurality of distributed guided user interfaces (GUIs) is described. The instructions when executed by one or more processors of a computing device, cause the computing device to: receive, at a server from a first dashboard application, activity data defining a first set of interactive display tasks of a first team at a first geographic location, wherein the first dashboard application executes on a first client device in communication with the server, and wherein the first dashboard application implements a first GUI displaying the first set of interactive display tasks on a display of the first client device as a set of drag and drop windows, each of the first set of interactive display tasks defining a task item and generated for a least one team member of the first team; and receive, at the server from a second dashboard application, activity data defining a second set of interactive display tasks of a second team at a second geographic location, wherein the second dashboard application executes on a second client device in communication with the server, and wherein the second dashboard application implements a second GUI displaying the second set of interactive display tasks on a display of the second client device as a set of drag and drop windows, each of the second set of interactive display tasks defining a task item and generated for a least one team member of the second team. The first geographic location is remote from the second geographic location and each of the first dashboard application and the second dashboard application execute a common set of instructions to render each of the first GUI and the second GUI. The instructions when executed by one or more processors of a computing device, also cause the computing device to: transmit, from the server to the second dashboard application, a suggested interactive display task, the suggested interactive display task generated by the server based on each of the a first set of interactive display tasks and the second set of interactive display tasks, the suggested interactive display task including a suggested task item for assignment to a least one member of the second team. The second dashboard application adds the suggested interactive display task to second set of interactive display tasks upon the authorization of the suggested interactive display task at the second client device, the authorization of the suggested interactive display task causing the second dashboard application to render the suggested interactive display on the second GUI as a new drag and drop window.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein:

FIG. 3 illustrates an exemplary embodiment of a GUI displaying a profile of a member of a team at a geographic location in accordance with various embodiments disclosed herein.

FIG. 5 illustrates an exemplary embodiment of a GUI displaying a dashboard for a team at a geographic location including metrics for individual team members in accordance with various embodiments disclosed herein.

FIG. 9 illustrates the exemplary embodiment of a GUI displaying a dashboard associated with task assignment for the team FIG. 8 after assignment of tasks via the dashboard in accordance with various embodiments disclosed herein.

DETAILED DESCRIPTION

Figure 1:
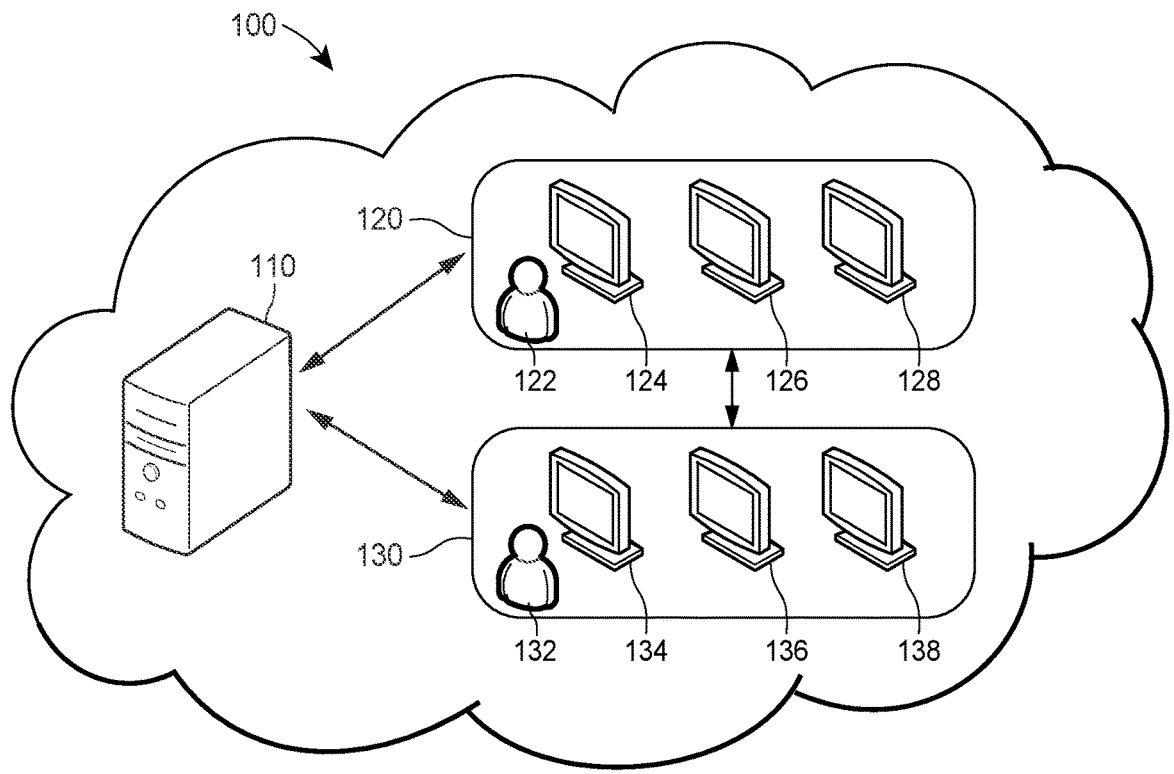
FIG. 1 illustrates an exemplary environment of a task management system configured to generate GUIs in accordance with various embodiments disclosed herein.

FIG. 1 illustrates an exemplary environment of a task management system configured to generate GUIs in accordance with various embodiments disclosed herein. The system may be a cloud based system configured to generate new or transformed GUIs based on a data generated, recorded, and/or aggregated from various different platforms (e.g., one or more computing devices associated with a first team at a first geographic location and/or one or more computing devices associated with a second team at a second geographic location) where the new integration data is enhanced with an enhanced, cross-platform integration format. Each of the disparate data sources may provide data for integration via a variety of communication protocols and in a variety of different communication or data types, including, but not limited to, push-based data, pull-based data, and message, queuing, and/or event based data. Generally, push-based data is data that is transmitted, without a request, from a source, platform service, or other computing device. Pull-based data, in contrast, is data that is transmitted, based on a request, from a source, platform service, or other computing device. Queue or event based data (i.e., queue based data and/or a queue event) is data that has been scheduled, in relation to other events or data, and is transmitted in a determined order (e.g., a first-in-first out order or a last-in-last out order). Such data may be ingested by a big-data view integration platform as described herein.

The task management system 100 may include a server 110. In various embodiments, the GUIs of the task management platform, including integration GUIs, as described herein, may be implemented in Hypertext Markup Language (HTML), JavaScript, etc. The task management platform may be implemented via client-server technologies, such a Tomcat J2EE Servlet container, Java Server Pages (JSP), Active Server Pages (ASP), or other client-server technologies. The GUIs of task management platform may communicate with task management platform via client-server requests and responses, asynchronous calls (e.g., via asynchronous JavaScript and extensible markup language (XML), i.e., AJAX calls), and/or via representational state transfer (RESTful) application programming interfaces (APIs). Any of the push data, pull data, and/or queue based data may be stored in databases such as IBM's DB2, Oracle, MySQL, MongoDB, other SQL-based or NoSQL-based database, or other data stores. In general, the server or backend components of the task management platform may provide common core features across all "AST Application Layer" to provide data for, e.g., for digital whiteboard GUIs or other such integration GUIs and/or non-integration GUIs, etc.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

The task management system includes a first team 120 and a second team 130. Each of the first team 120 and the second team 130 may be located at locations geographically remote from one another. Optionally, the task management system may include three or more teams. The additional teams may also be located geographically remote from one another and from the first team 120 and the second team 130. Each team includes one or more team member (e.g., team member 122 of the first team 120 and team member 132 of the second team 130). At least one member of each team may be a team manager. Additionally, one or more members of each team may be employees.

Each team is associated with at least one client device (e.g., team 120 may be associated with client devices 124, 126, and 128, and team 130 may be associated with client devices 134, 136, and 138). Each client device is configured to execute a dashboard application and each client device is in communication with the server 110. The dashboard application operating on the one or more client devices, 124, 126, and 128, associated with the first team 120 and the dashboard application operating on the one or more client devices 134, 136, and 138 associated with the second team 130 may execute a common set of instructions to render the associated GUIs.

The dashboard application may be configured to implement at a display of each client device e.g., client devices 124, 126, 128, 134, 136, and 138) a GUI displaying a set of interactive display tasks. The interactive display tasks may be rendered as a set of drag and drop windows at the GUI. Each interactive display task may include a task item for assignment to at least one member of a team (e.g., team member 122 of the first team 120 and team member 132 of the second team 130.)

Additionally, the dashboard application may be configured to transmit, from the client device to the server 110, activity data defining a set of interactive display tasks of the team associated with the client device. For example, each client device may be configured to transmit activity data based on the interaction of one or more team member with the GUI of the client device.

The server 110 may receive activity data from the first team 120 defining the set of interactive display tasks and the server 110 may train a machine-learning model. The server 110 may train the machine learning model by, for example, generating a first set of feature data and a first set of label data based on the activity data and train the machine-learning model based on at least the first set of feature data and the first set of label data. The label data may comprise one or more task items of one or more members of the first team 120, and the feature data may comprise trigger data that triggered generation of the one or more task items. For example, the first set of label data may be a task for a member 122 of the first team 120 to respond to a claim made by a customer and the feature data may comprise a call from a customer making a claim.

Based on the trained model and the activity data from the second team 130, the server 110 may generate one or more suggested interactive display tasks including a suggested task item for assignment to at least one team member 132 of the second team 130. The suggested task item may be a suggested staffing related task, a suggested compensation related task, a suggested employee training related task, or a suggested workflow related task. For example, the suggested task item may add an additional task for completion by a member of the second team 130, a reassignment of a task to another team member of the second team 130, a hiring suggestion for a new team member of the second team 130, a training or licensing session for a member of the second team 130, and/or a change in compensation for a member of the second team 130. Further, the suggested task item may also include a suggested team member for assignment to the suggested task item. The suggested team member may be determined based on a licensing and compliance status of the suggested team member, a skill profile of the team member, and/or a workload capacity of the team member.

Optionally, the server 110 may determine a first outcome value based on activity data of the first team 120, determine a second outcome value based on activity data of the second team 130, and in response to the first outcome value being higher than the second outcome value, determine the suggested interactive display task. For example, the server 110 may determine a time efficiency, a resource efficiency, and/or a customer satisfaction of the first team 120 and the second team 130. In response to the time efficiency, the resource efficiency, and/or the customer satisfaction being higher for the first team 120 than the second team 130, the server 110 may determine the suggested interactive display task.

Additionally, the server 110 may determine a similarity metric based on at least a portion of characteristics of the first team 120 and at least a portion of characteristics of the second team 130; and in response to the similarity metric being above a threshold, generate the suggested interactive display task. The characteristics may include team geographic location characteristics, team size characteristics, and team member characteristics. For example, the server 110 may determine that the first team 120 and the second team 130 have a similar number of team members, are located in similar metropolitan areas, and/or have a similar team structure and in response to this determination, the server 110 may determine the suggested interactive display task.

Additionally, each client device may be able to receive data from the server 110. The data received from the server 110 may be based on activity data received from one or more other client device associated with one or more other team. Each client device may receive, from the server 110, a suggested interactive display task. Each dashboard application executing on each client device may be configured to, in response to authorization of the suggested interactive display task at the client device, add the suggested interactive display task to the set of interactive display tasks including rendering the suggested interactive display task on the second GUI as a new drag and drop window.

Each client device may be configured such that the interface of the client device system allows a user of the client device to assign, reassign, and manage tasks associated with a team associated with the client device. Additionally, the interactive display of the client device may display a suggested task item for assignment to at least one team member of the team associated with the client device. Additionally, the interface may display the progress, the assignment, the importance, the due date, and any other information associated with a task required by the team associated with the client device.

Additionally, when the system includes three or more teams, the machine learning model may be further trained based on the activity data from the three or more teams, the suggested interactive display task including the suggested task item may be determined from the activity data from the three or more teams, and the dashboard application may present a suggested task item to any of the three or more teams.

Figure 2:
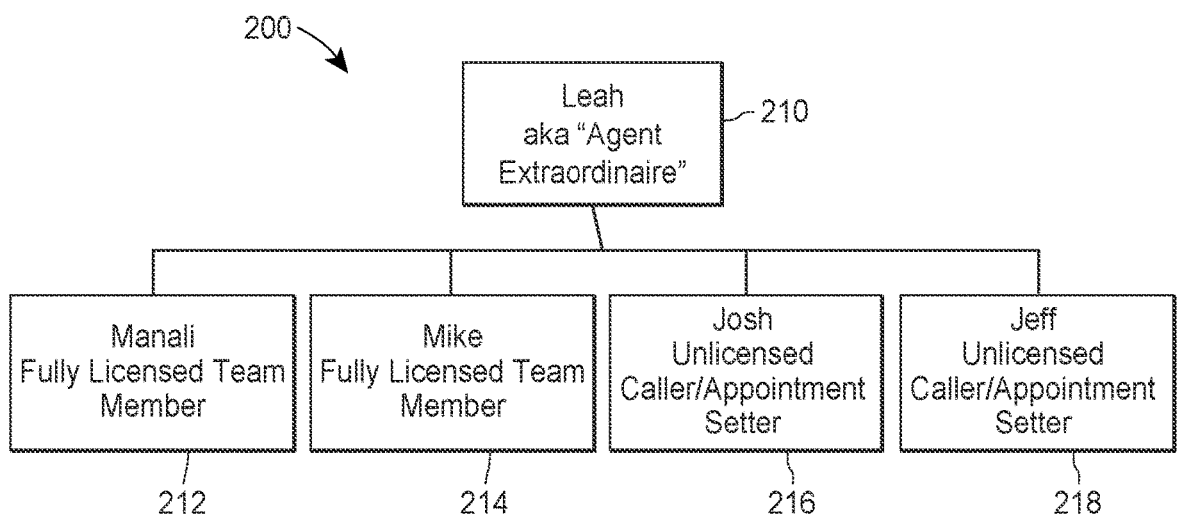
FIG. 2 illustrates an exemplary chart of a team at a geographic location in accordance with various embodiments disclosed herein.

FIG. 2 illustrates an exemplary chart 200 of a team (e.g., team 120 and team 130) at a geographic location in accordance with various embodiments disclosed herein. Each team may include a team manager 210. The team manager 210 may assign, reassign, and otherwise manage tasks associated with the team. The team manager 210 may assign, reassign, and manage tasks via a user interface of a client device (e.g. client device 124). Further, the team manager 210 may monitor the progress or status of tasks via the user interface of the client device (e.g. client device 124). The team manager 210 may also receive, at the client device (e.g. client device 124), one or more suggested task items from the server 110.

The team may also include one or more team member (e.g. team members 212, 214, 216, and 218). Each team member may have one or more defining characteristics such as "veteran team member" and "3 months in the role." Additionally, each team member 212, 214, 216, and 218 may have one or more status such as "fully licensed team member" and "unlicensed caller/appointment settler." The team manager 210 may assign tasks to each of the one or more team members 212, 214, 216, and 218 based on defining characteristics and statuses of the team members 212, 214, 216, and 218. Each of the one or more other team members 212, 214, 216, and 218 may access or modify the progress of one or more tasks via a user interface of the client device (e.g. client device 126). For example, the one or more team members 212, 214, 216, and 218 can indicate that a task is in progress or has been completed.

FIG. 3 illustrates an exemplary embodiment of a GUI 300 displaying a profile of a member of a team 302 at a geographic location in accordance with various embodiments disclosed herein. The GUI 300 may include interactive buttons (e.g. buttons 310 and 312) that provide more information about the team member 302. The GUI 300 may include information about the team with which the team member 302 is associated. Team information may comprise a geographic location of the team 314.

Figure 4:
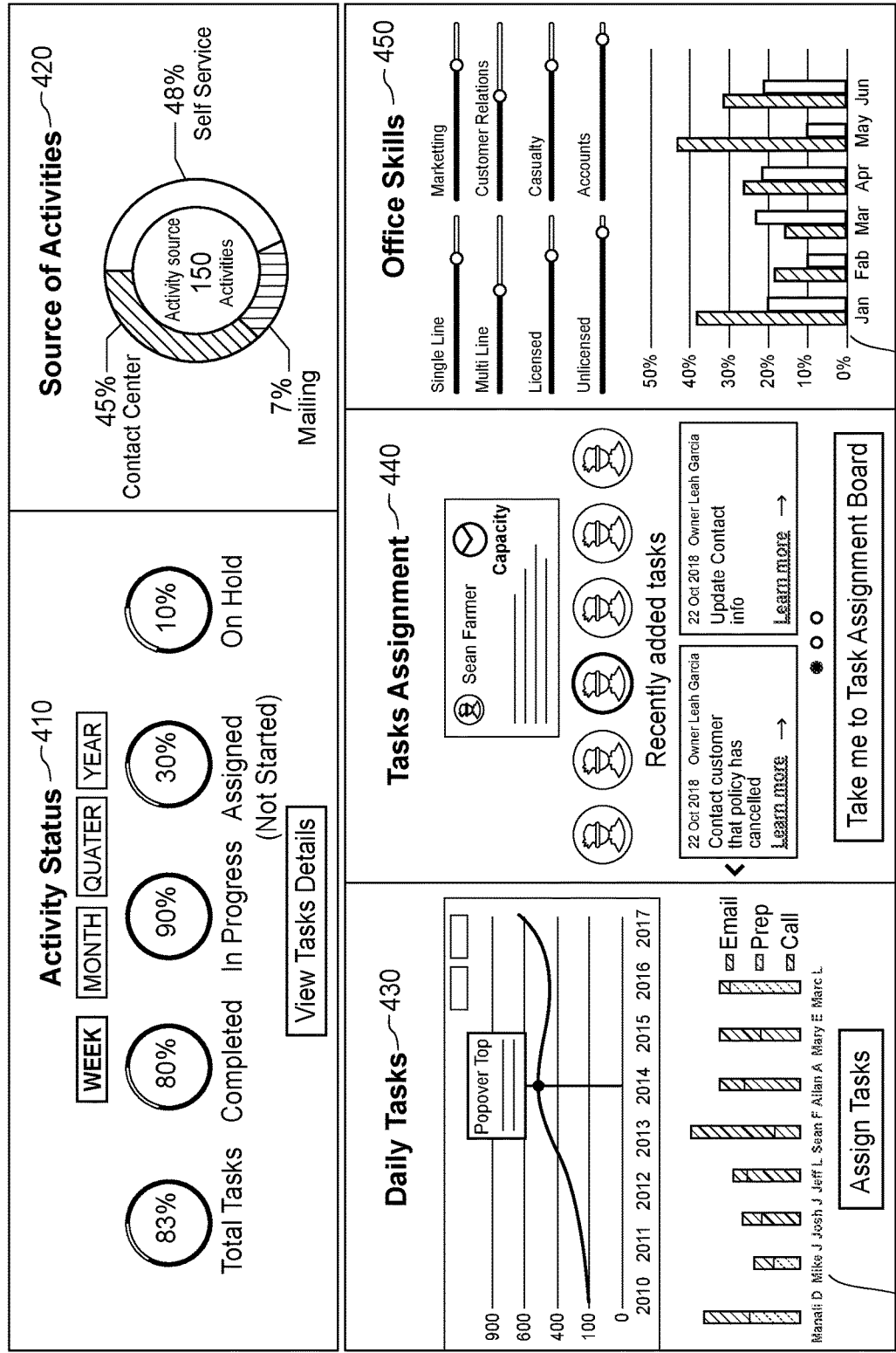
FIG. 4 illustrates an exemplary embodiment of a GUI displaying a dashboard associated with a team at a geographic location in accordance with various embodiments disclosed herein.

FIG. 4 illustrates an exemplary embodiment of a GUI displaying a dashboard 400 associated with a team at a geographic location in accordance with various embodiments disclosed herein. This dashboard may be accessed by the team leader 210 of a team. The dashboard 400 may include an activity status 410 of the one or more activities to be completed by the team. The status of the activities may be "completed," "in progress," "assigned (not started)," and "on hold." The dashboard may also include a source of activities 420. Optionally, a status of an activity may include a suggested task item generated by the server 110 and based on activity data from one or more other geographic locations. The dashboard may include daily tasks 430. The daily tasks may show each member of a team and the number of tasks assigned to that member of the team 432. Additionally, the dashboard 400 may include task assignment 440 and office skills 450. Office skills may include the percentage of team members of each team proficient in one or more skills 452. Interaction with the dashboard 400 may result in the collection of activity data collected by the client device and sent to the server 110. FIG. 5 illustrates an example embodiment of a GUI associated with a dashboard 500 for a team at a geographic location including all members of the team. Dashboard 500 may be another view of dashboard 400. Dashboard 500 may be additionally available to team leader 210 and provide further information about source of activities 520 and the tasks assigned to each member of a team 530.

Figure 6:
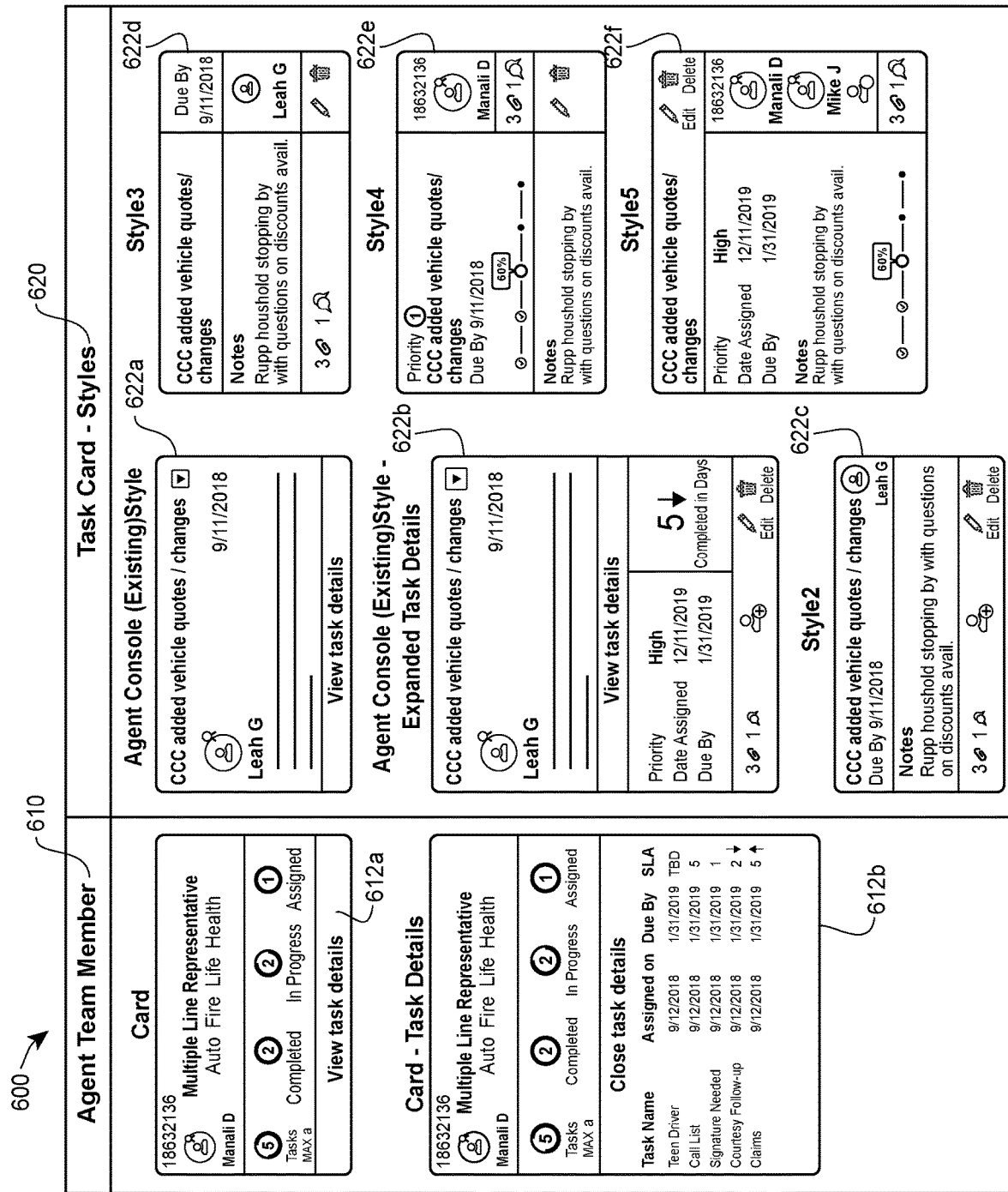
FIG. 6 illustrates an exemplary chart of options associated with team member identifiers and task identifiers in accordance with various embodiments disclosed herein.

FIG. 6 illustrates an exemplary chart 600 of options associated with team member identifiers and task identifiers in accordance with various embodiments disclosed herein. Portion 610 of the chart 600 includes information associated with a team member associated with a team at a geographic location. The information associated with a team member may include the tasks associated with the team member. Each team member may be denoted by a card such as member card 612a and 612b. Each member card 612a and 612b may be personalized or otherwise altered such that each member card 612a and 612b shows more or less information. For example a member card may optionally show only a team members current workflow and availability or each member card may show each task associated with the member. Portion 620 of the chart 600 includes information associated with tasks to be completed. Each task may be denoted by a task card such as card 622a-e. Each task card 622a-e may include more or less information about the task.

Figure 7:
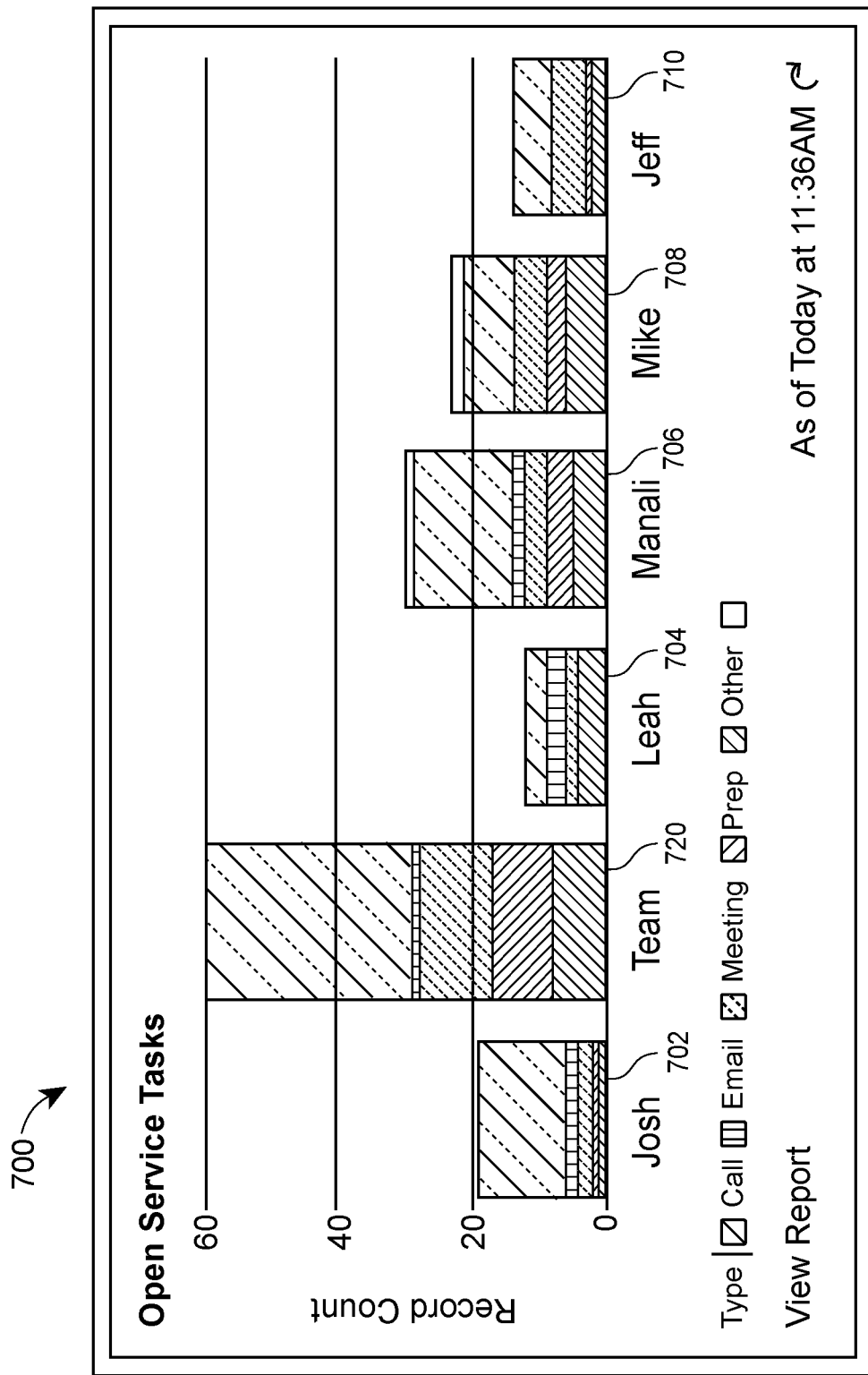
FIG. 7 illustrates an exemplary embodiment of a portion GUI displaying a dashboard associated with member workflow and availability information for a team at a geographic location in accordance with various embodiments disclosed herein.

FIG. 7 illustrates an exemplary embodiment of a portion GUI displaying a dashboard 700 associated with member workflow and availability information for a team at a geographic location in accordance with various embodiments disclosed herein. The portion of the dashboard 700 may be from dashboard 500. The portion of the dashboard 700 may show information associated with a workload of multiple team members 702, 704, 706, 708, and 710. Each member of a team may have one or more types of tasks assigned to the member. Task types may include "call" "email" "meeting" "prep" or "other." The workload may be a daily workload, a weekly workload, or a workload over any other timeframe. Additionally, the workload may be depicted for a team 720 as a whole.

Figure 8:
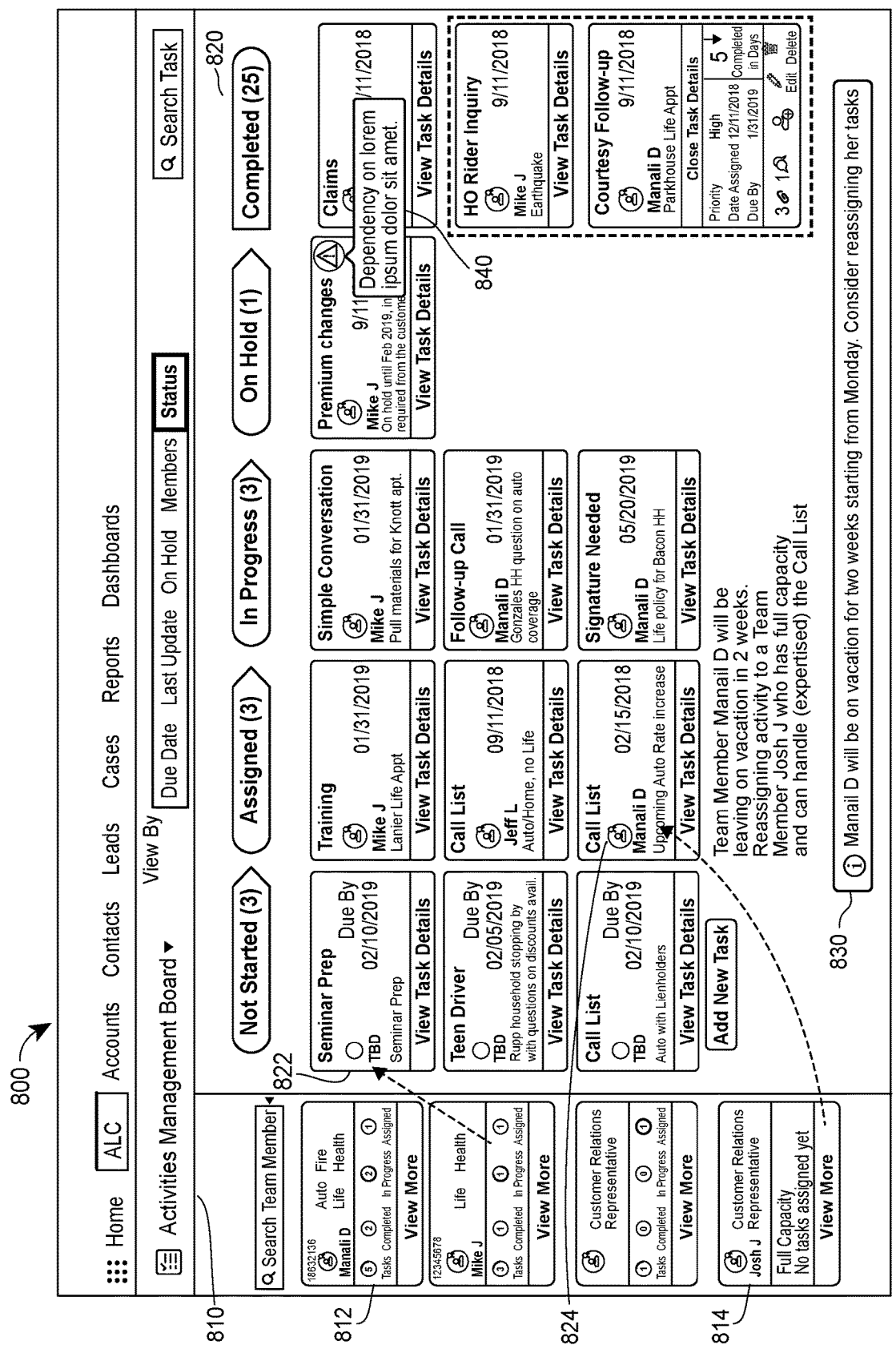
FIG. 8 illustrates an exemplary embodiment of a GUI displaying a dashboard associated with task assignment for a team at a geographic location in accordance with various embodiments disclosed herein.
Figure 9:
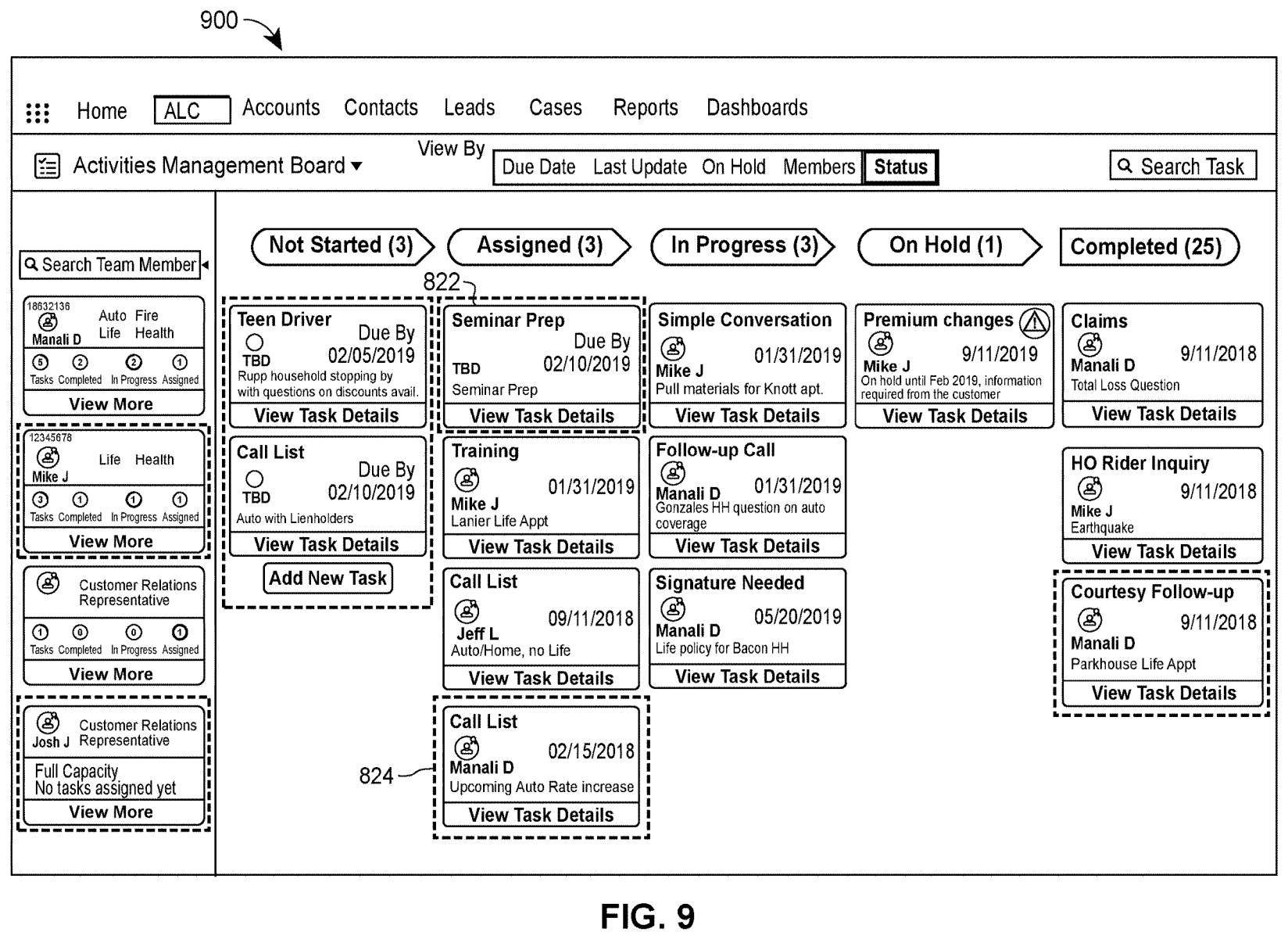

FIG. 8 illustrates an exemplary embodiment of a GUI displaying a dashboard 800 associated with task assignment for a team at a geographic location in accordance with various embodiments disclosed herein. Dashboard 800 may include a first portion 810 including information associated with team members associated a team. Each team member may be described by a virtual card (e.g. 812 and 814) of the dashboard 800. Dashboard 800 may include a second portion 820 including information associated with one or more tasks associated with a team at a geographic location. Each of the one or more tasks may be described by a virtual card (e.g. 822 and 824) of dashboard 800. A team leader 210 may assign or reassign a task to a team member by dragging and dropping the team member card onto the team task card. Additionally, dashboard 800 may include additional information related to staffing 830. For example, the dashboard 800 may include a notification 830 that a team member may be out of town or otherwise unavailable. Additionally, one or more task cards may include a notification 840 indicating an update to the task. FIG. 9 illustrates the exemplary embodiment of a GUI displaying a dashboard 900 associated with task assignment for the team FIG. 8 after assignment of tasks via the dashboard in accordance with various embodiments disclosed herein. After assignment, task card 822 may move to the assigned position and may be assigned to a team member. Additionally, after reassignment, task card 824 may be assigned to a new team member.

Figure 10:
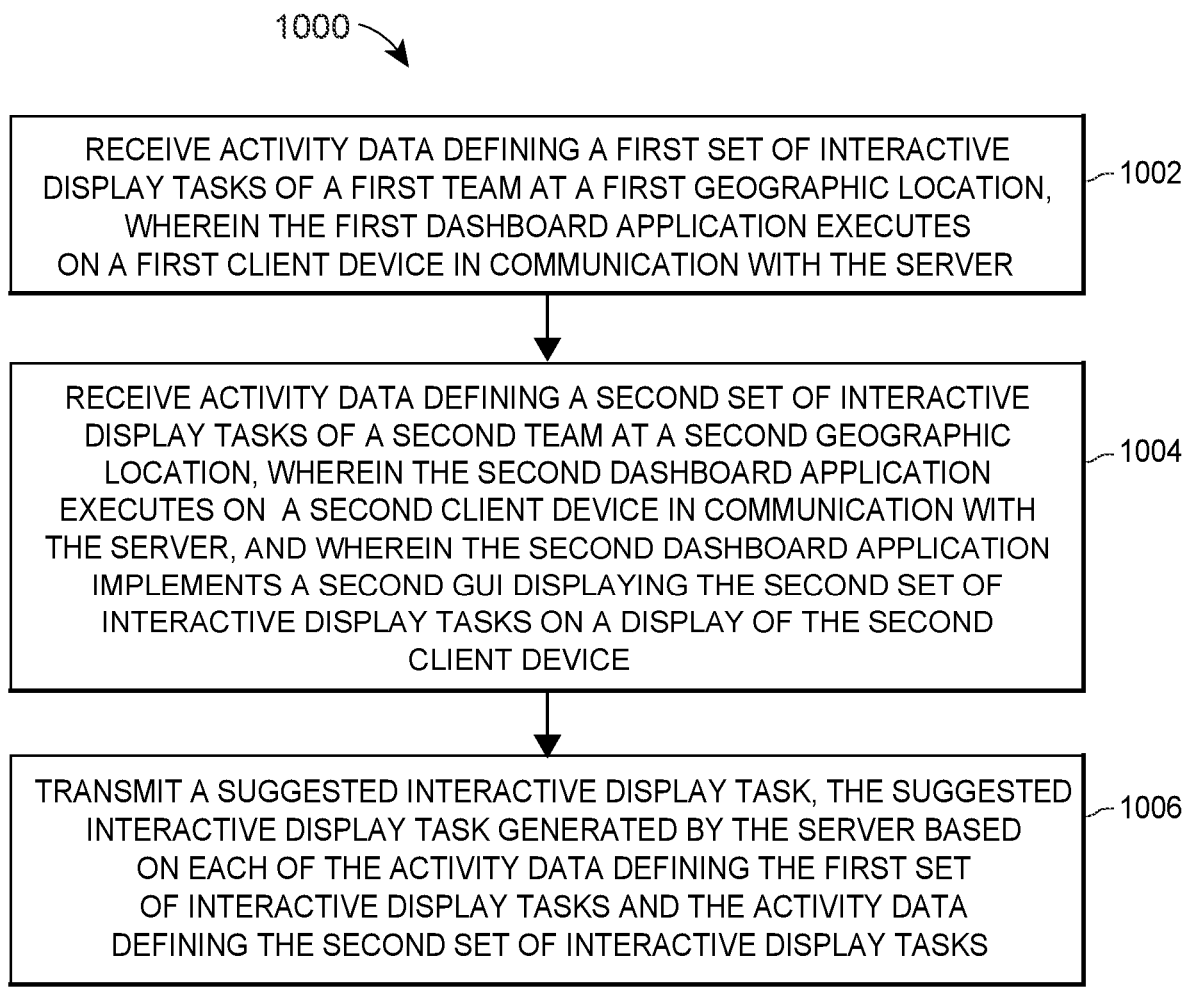
FIG. 10 illustrates an exemplary flow-diagram associated with the task management system of FIG. 1 in accordance with various embodiments disclosed herein.

FIG. 10 illustrates an exemplary flow-diagram 1000 associated with the task management system of FIG. 1 in accordance with various embodiments disclosed herein.

At step 1002, a server (e.g., server 110) may receive activity data defining a first set of interactive display tasks of a first team at a first geographic location, wherein the first dashboard application executes on a first client device in communication with the server. Next, at step 1004, the server may receive activity data defining a second set of interactive display tasks of a second team at a second geographic location, wherein the second dashboard application executes on a second client device in communication with the server, and wherein the second dashboard application implements a second GUI displaying the second set of interactive display tasks on a display of the second client device. Finally, at step 1006, the server may transmit a suggested interactive display task, the suggested interactive display task generated by the server based on each of the activity data defining the first set of interactive display tasks and the activity data defining the second set of interactive display tasks.

Figure 11:
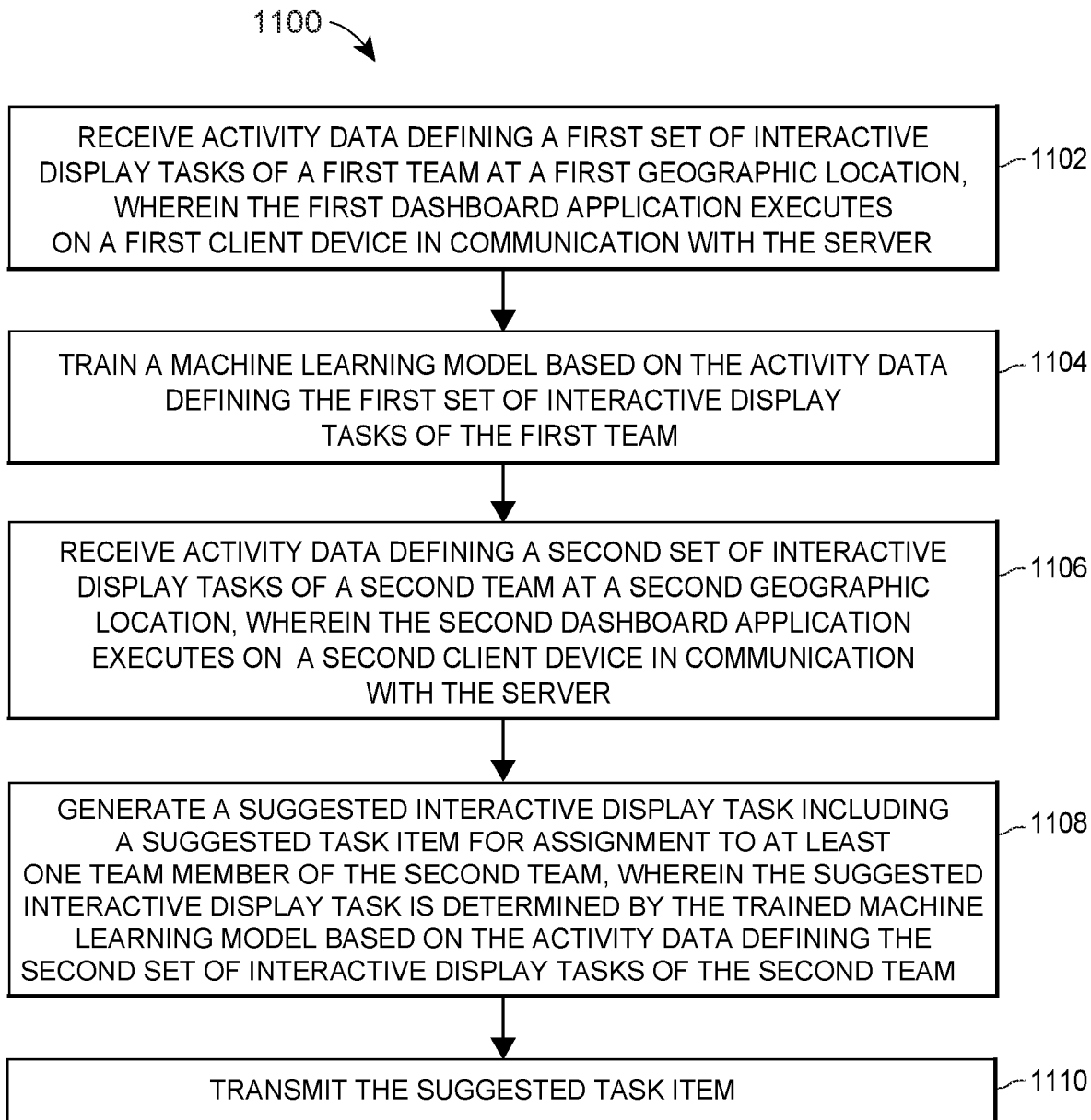
FIG. 11 illustrates another exemplary flow-diagram associated with the task management system of FIG. 1 in accordance with various embodiments disclosed herein.

FIG. 11 illustrates another exemplary flow-diagram 1100 associated with the task management system of FIG. 1 in accordance with various embodiments disclosed herein.

At step 1102, a server (e.g., server 110) may receive activity data defining a first set of interactive display tasks of a first team at a first geographic location, wherein the first dashboard application executes on a first client device in communication with the server. At step 1004, the server may train a machine learning model based on the activity data defining the first set of interactive display tasks of the first team. Next, at step 1006, the server may receive activity data defining a second set of interactive display tasks of a second team at a second geographic location, wherein the second dashboard application executes on a second client device in communication with the server. At step 1008, the server may then generate a suggested interactive display task including a suggested task item for assignment to at least one team member of the second team, wherein the suggested interactive display task is determined by the trained machine learning model based on the activity data defining the second set of interactive display tasks of the second team. Finally, at step 1110, the server may transmit the suggested task item.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A system comprising:
   a dashboard application executing on a client computing device of a user, the dashboard application being in communication with one or more servers, and the dashboard application being configured to:
   implement a graphical user interface (GUI) displaying indications of a set of tasks and a first plurality of persons other than the user, the indications of each task among the set of tasks and each person among the first plurality of persons being displayed as a respective drag and drop item among a plurality of drag and drop items in the first GUI;
   receive, from the one or more servers, an indication of a suggested task;
   subsequent to receiving the indication of the suggested task, add the suggested task to the set of tasks as a new drag and drop item among the plurality of drag and drop items in the GUI; and
   cause the suggested task to be assigned by the user to a particular person from among the first plurality of persons in response to a drag and drop input of the user dragging the corresponding drag and drop item of the particular person onto the new drag and drop item for the suggested task.

2. The system of claim 1, wherein the suggested task is generated via the one or more servers based upon activity data defining activity of a second plurality of persons.

3. The system of claim 2, wherein the activity data defines activity of the second plurality of persons at a geographic location remote from a location of the user or the first plurality of persons.

4. The system of claim 2, wherein the suggested task is generated via the one or more servers by comparing the activity data of the second plurality of persons to activity data of the first plurality of persons.

5. The system of claim 2, wherein the suggested task is generated via the one or more servers based upon location characteristics, team size characteristics, or personal characteristics associated with the first plurality of persons or the second plurality of persons.

6. The system of claim 1, wherein the dashboard application is configured to add the suggested task to the set of tasks responsive to receiving an authorization via the user.

7. The system of claim 1, wherein receiving the indication of the suggested task includes receiving an indication of a suggested person for assignment to the suggested task, the suggested person being selected from among the first plurality of persons.

8. The system of claim 7, wherein the suggested person is selected based upon a licensing and compliance status of the suggested person, a skill profile of the suggested person, or a workload capacity of the suggested person.

9. A computer-implemented method performed via a dashboard application executed via one or more processors of a client computing device of a user, the method comprising:
   implementing a graphical user interface (GUI) displaying indications of a set of tasks and a first plurality of persons other than the user, the indications of each task among the set of tasks and each person among the first plurality of persons being displayed as a respective drag and drop item among a plurality of drag and drop items in the first GUI;
   receiving, from one or more servers, an indication of a suggested task;
   subsequent to receiving the indication of the suggested task, adding the suggested task to the set of tasks as a new drag and drop item among the plurality of drag and drop items in the GUI; and
   causing the suggested task to be assigned by the user to a particular person from among the first plurality of persons in response to a drag and drop input of the user dragging the corresponding drag and drop item of the particular person onto the new drag and drop item for the suggested task.

10. The computer-implemented method of claim 9, wherein the suggested task is generated via the one or more servers based upon activity data defining activity of a second plurality of persons.

11. The computer-implemented method of claim 10, wherein the activity data defines activity of the second plurality of persons at a geographic location remote from a location of the user or the first plurality of persons.

12. The computer-implemented method of claim 10, wherein the suggested task is generated via the one or more servers by comparing the activity data of the second plurality of persons to activity data of the first plurality of persons.

13. The computer-implemented method of claim 10, wherein the suggested task is generated via the one or more servers based upon location characteristics, team size characteristics, or personal characteristics associated with the first plurality of persons or the second plurality of persons.

14. The computer-implemented method of claim 9, further comprising receiving an authorization via the user to add the suggested task to the set of tasks, wherein the adding the suggested task to the set of tasks is performed responsive to receiving the authorization.

15. The computer-implemented method of claim 9, wherein receiving the indication of the suggested task includes receiving an indication of a suggested person for assignment to the suggested task, the suggested person being selected from among the first plurality of persons.

16. The computer-implemented method of claim 15, wherein the suggested person is selected based upon a licensing and compliance status of the suggested person, a skill profile of the suggested person, or a workload capacity of the suggested person.

17. One or more non-transitory computer readable media storing instructions that, when executed via one or more processors of a client computing device of a user, cause the client computing device to:
   implement a graphical user interface (GUI) via a dashboard application, the GUI displaying indications of a set of tasks and a first plurality of persons other than the user, the indications of each task among the set of tasks and each person among the first plurality of persons being displayed as a respective drag and drop item among a plurality of drag and drop items in the first GUI;
   receive, from one or more servers, an indication of a suggested task;
   subsequent to receiving the indication of the suggested task, add the suggested task to the set of tasks as a new drag and drop item among the plurality of drag and drop items in the GUI; and
   cause the suggested task to be assigned by the user to a particular person from among the first plurality of persons in response to a drag and drop input of the user dragging the corresponding drag and drop item of the particular person onto the new drag and drop item for the suggested task.

18. The one or more non-transitory computer readable media of claim 17, wherein the suggested task is generated via the one or more servers based upon activity data defining activity of a second plurality of persons.

19. The one or more non-transitory computer readable media of claim 17, wherein the dashboard application is configured to add the suggested task to the set of tasks responsive to receiving an authorization via the user.

20. The one or more non-transitory computer readable media of claim 17, wherein receiving the indication of the suggested task includes receiving an indication of a suggested person for assignment to the suggested task, the suggested person being selected from among the first plurality of persons.

* * * * *